United States Patent [19]
Stinson et al.

[11] Patent Number: 5,340,667
[45] Date of Patent: Aug. 23, 1994

[54] BATTERY RECIRCULATION AND RECHARGE SYSTEM

[76] Inventors: Billy M. Stinson, Rte. 4, Box 447, Gatesville, Tex. 76528; Thomas A. Stoneham, 1216 Concho Dr., Benbrook, Tex. 76126

[21] Appl. No.: 158,861

[22] Filed: Nov. 29, 1993

Related U.S. Application Data

[63] Continuation of Ser. No. 3,039, Jan. 11, 1993, abandoned.

[51] Int. Cl.$^5$ ............................................. H01M 2/40
[52] U.S. Cl. ........................................ 429/64; 429/51; 429/63; 429/72; 429/81; 429/95
[58] Field of Search ............... 429/70, 67, 8, 51, 80, 429/95, 72, 81, 63, 64

[56] References Cited

U.S. PATENT DOCUMENTS

| | | | |
|---|---|---|---|
| 4,308,322 | 12/1981 | Hammar | 429/53 |
| 4,735,872 | 4/1988 | Maimoni | 429/72 X |
| 4,820,598 | 4/1989 | Descroix et al. | 429/62 |
| 4,842,963 | 6/1989 | Ross, Jr. | 429/21 |
| 4,963,444 | 10/1990 | Delaney | 429/67 |

*Primary Examiner*—John S. Maples
*Attorney, Agent, or Firm*—Henderson & Sturm

[57] ABSTRACT

A system for increasing the efficiency of electro-chemical batteries includes a liquid electrolyte battery having positive and negative terminals and electrolyte fluid input and output ports. The system also is provided with an electrolyte distribution manifold, an electrolyte filter, an electrolyte holding tank, and a pump and control valves for circulating the electrolyte fluid between the battery and the holding tank, whereby stratification of the electrolyte fluid is prevented and gases and solids are removed from the electrolyte.

8 Claims, 6 Drawing Sheets

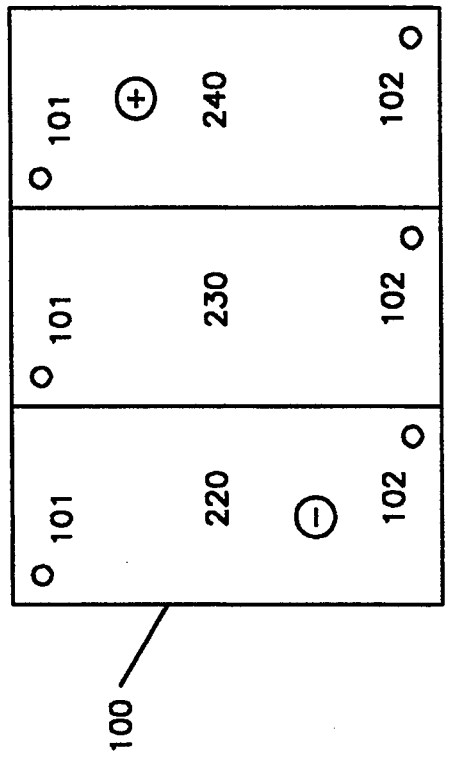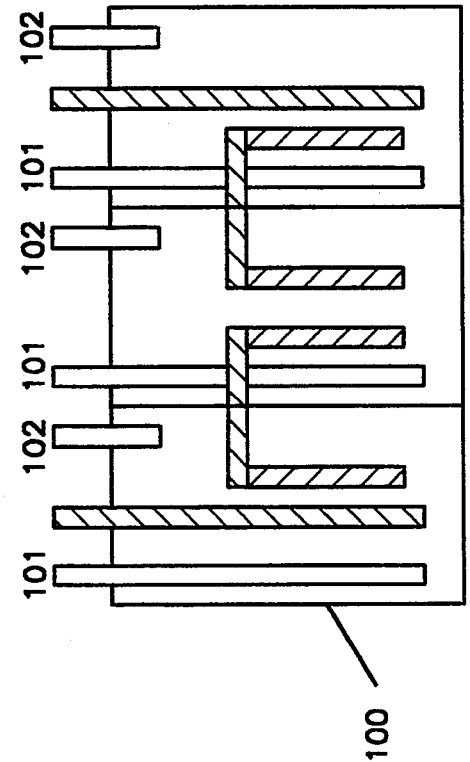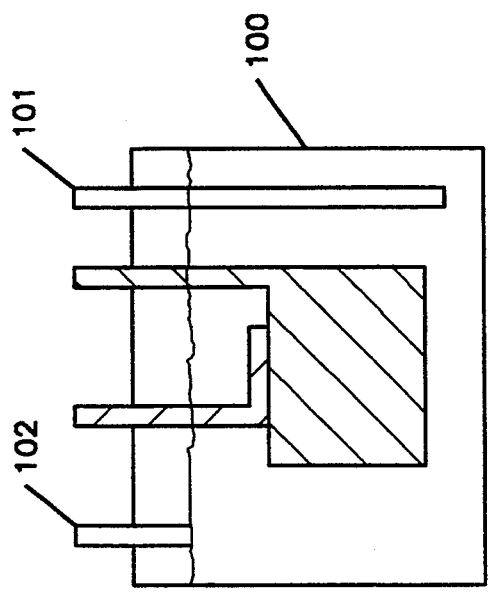

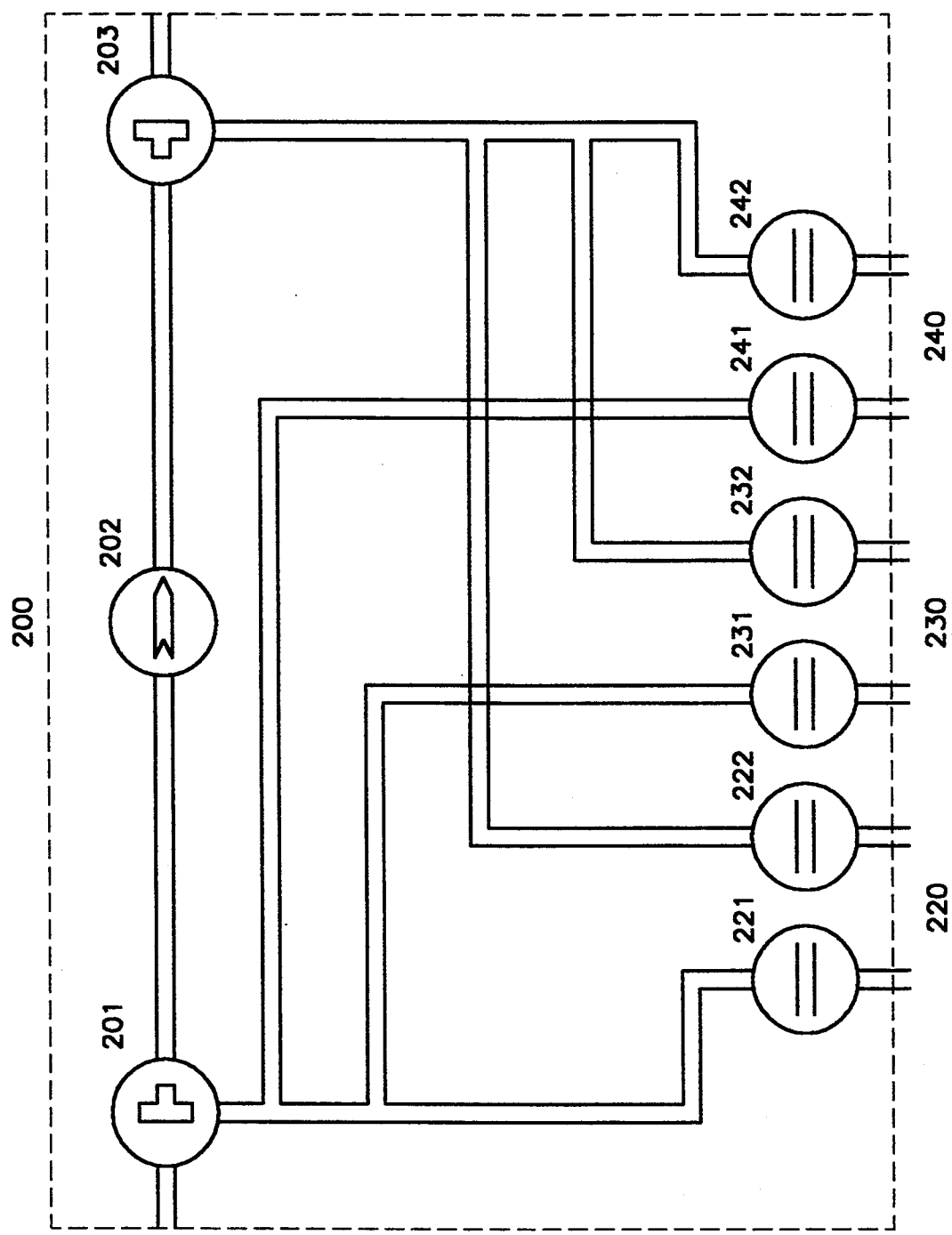

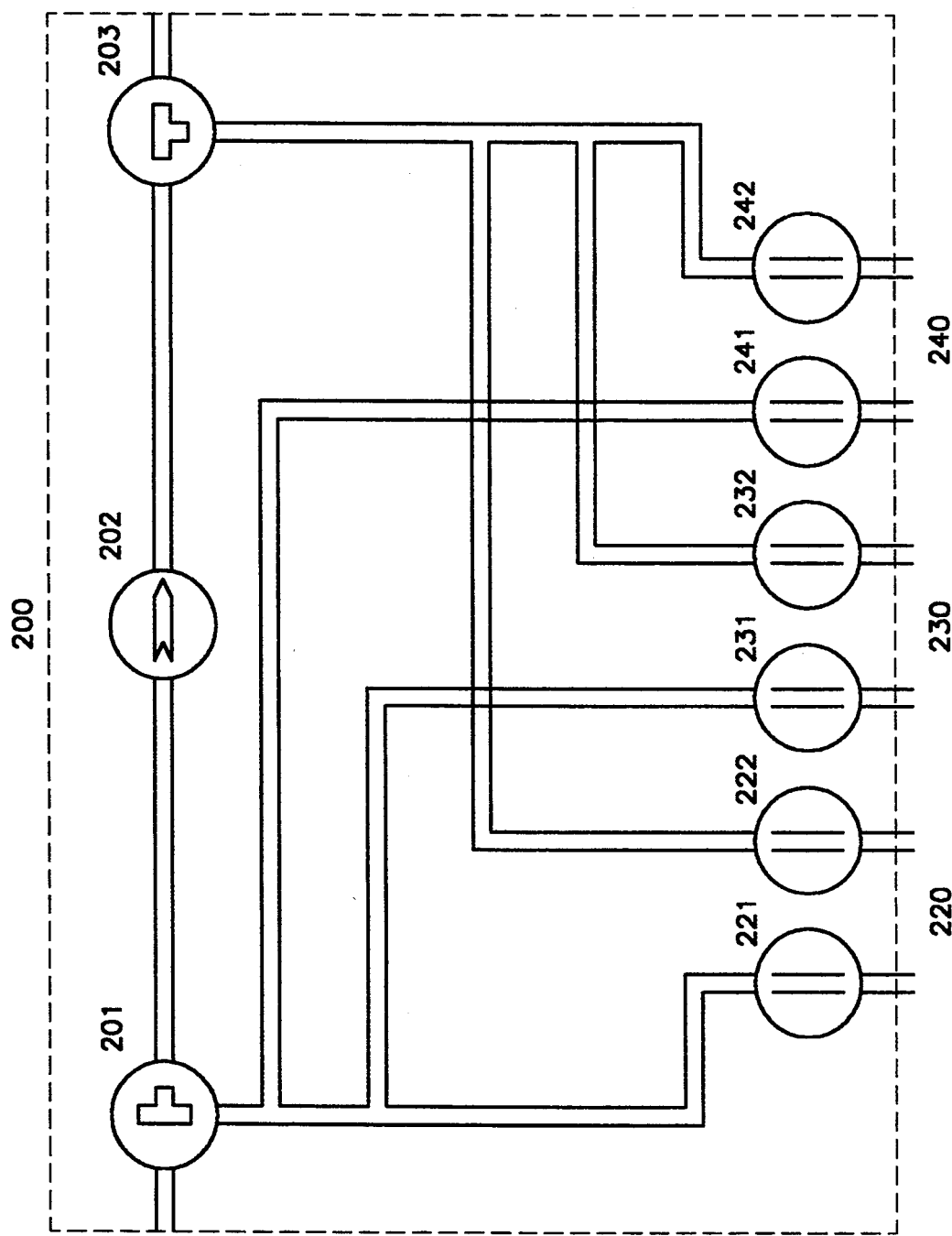

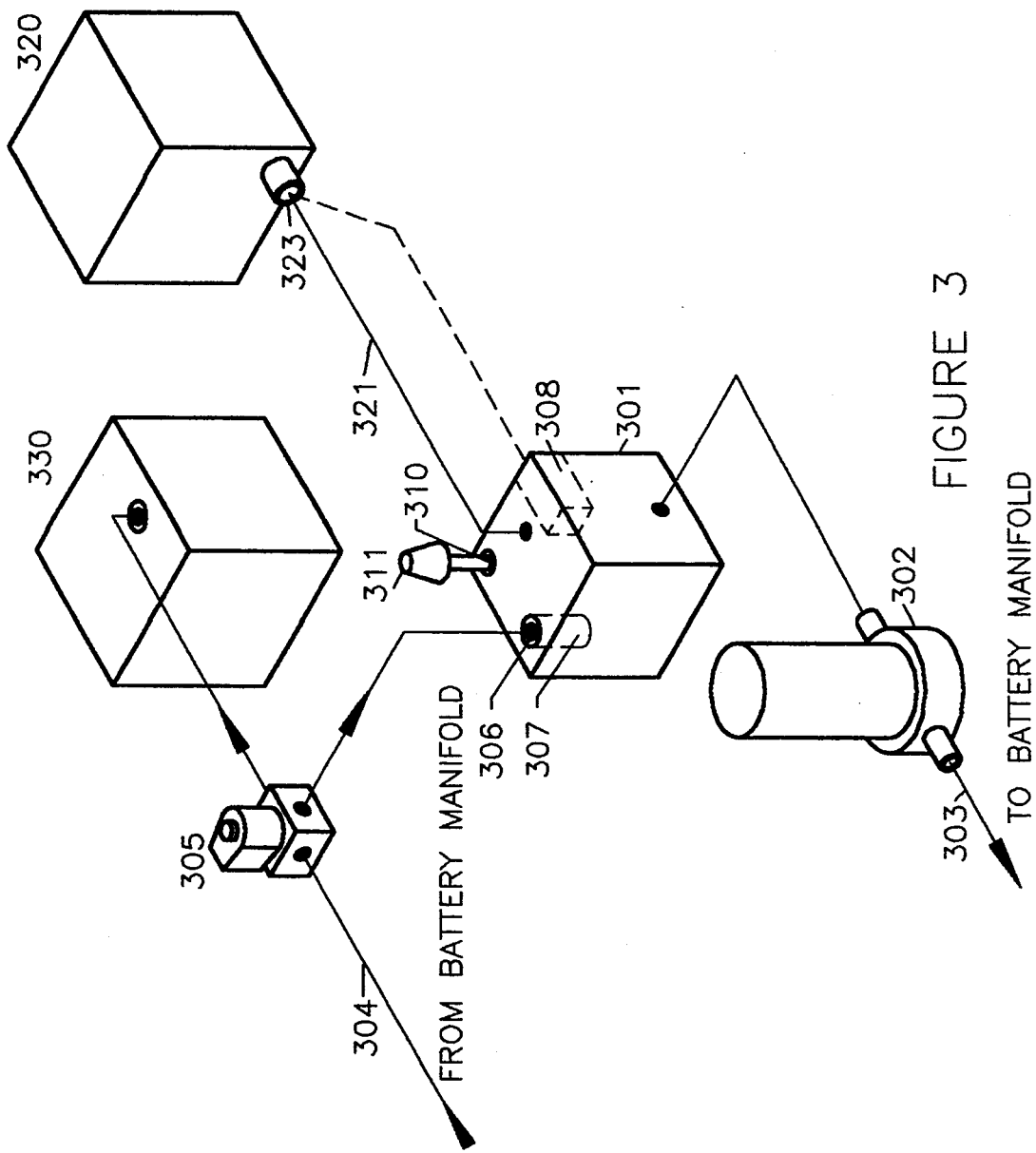

BATTERY RECIRCULATION AND RECHARGE SYSTEM

This application is a continuation of application Ser. No. 08/003,039 filed Jan. 11, 1993, now abandoned.

TECHNICAL FIELD

The present invention is directed to electro-chemical batteries and more particularly to a process and apparatus for increasing the efficiency of electro-chemical batteries.

BACKGROUND ART

The problems of electrolyte stratification, gas bubble formation on the electrodes, and a build-up of electrolyte impurities are well known in the art. Stratification occurs during battery charge/discharge cycling. The increase and decrease of the specific gravity of the electrolyte tends toward a buildup of higher specific gravity electrolyte toward the bottom of the cell and a build-up of lower specific gravity electrolyte toward the top of the cell. This non-uniformity of electrolyte specific gravity reduces the efficiency of the battery. Electrode gas bubble build-up occurs when hydrogen and oxygen gases tend to cling to the surface of the electrodes. This bubble formation reduces the surface area of the electrodes available for reaction with the electrolyte and reduces battery efficiency. Solid byproducts introduced into the electrolyte during the electro-chemical reactions occurring within the battery also tend to reduce battery efficiency.

Various attempts have been made to deal with these problems, but with only limited success. One popular method teaches the use of an over-voltage during charging to create gas bubbles which then tend to mix the stratified electrolyte as they rise to the top of the electrolyte. Hammer (U.S. Pat. No. 4,308,322) teaches a method of capturing overcharge gases and conducting the bubbles through a vertical conduit, creating a pump that transports high specific gravity electrolyte from the bottom of the battery cell to the top of the cell, thus reducing stratification. Ross (U.S. Pat. No. 4,842,963) teaches the external circulation of the electrolyte as well as filtration. This device, however, is designed for use with the zinc air battery with its built-in internal circulation capability. The design is not compatible with lead-acid batteries, nor does it provide for automatic system electrolyte quantity control or for recovery of the water after it has broken down into oxygen and hydrogen gases.

DISCLOSURE OF THE INVENTION

The present invention is a system for increasing the efficiency of electrochemical batteries. The system includes a liquid electrolyte battery having positive and negative terminals and electrolyte fluid input and output ports. The battery is adapted to act as a power source for converting potential energy into electric current. The system also is provided with an electrolyte filter, an electrolyte holding tank, and a pump for circulating the electrolyte fluid between the battery and the holding tank, whereby stratification of the electrolyte fluid is prevented and the battery's efficiency is increased.

A primary object of the present invention is to provide an improved system for increasing the efficiency of electro-chemical batteries by preventing the stratification of the electrolyte.

Another object of the present invention is to provide an improved system for increasing the efficiency of electro-chemical batteries by filtering solid byproducts from the electrolyte.

Another object of the present invention is to provide an improved system for increasing the efficiency of electro-chemical batteries by removing hydrogen and oxygen gases from the electrodes and from the electrolyte.

Another object of the present invention is to provide an improved system for increasing the efficiency of electro-chemical batteries by providing a convenient method for introducing fresh electrolyte into the battery.

Another object of the present invention is to provide an improved system for increasing the efficiency of electro-chemical batteries by ensuring that each battery cell is maintained at the optimum electrolyte fluid level. These and other objects will be apparent to those skilled in the art.

BRIEF DESCRIPTION OF THE DRAWINGS

Other objects and advantages of the invention will become apparent upon reading the following detailed description and upon reference to the drawings, in which:

FIG. 1a is an end view cross section of a liquid electrolyte battery showing electrolyte input and output tubes and the cell electrodes;

FIG. 1b is a side view cross section showing the internal features of a liquid electrolyte battery in a 3-cell configuration;

FIG. 1c is a top view showing the input and output tubes as well as the positive and negative battery posts;

FIGS. 2a-2c show 3 views of the input/output manifold in the closed, momentary equalize, and transfer configurations;

FIG. 3 is a view of the overall system configuration; and

Figure 2C:
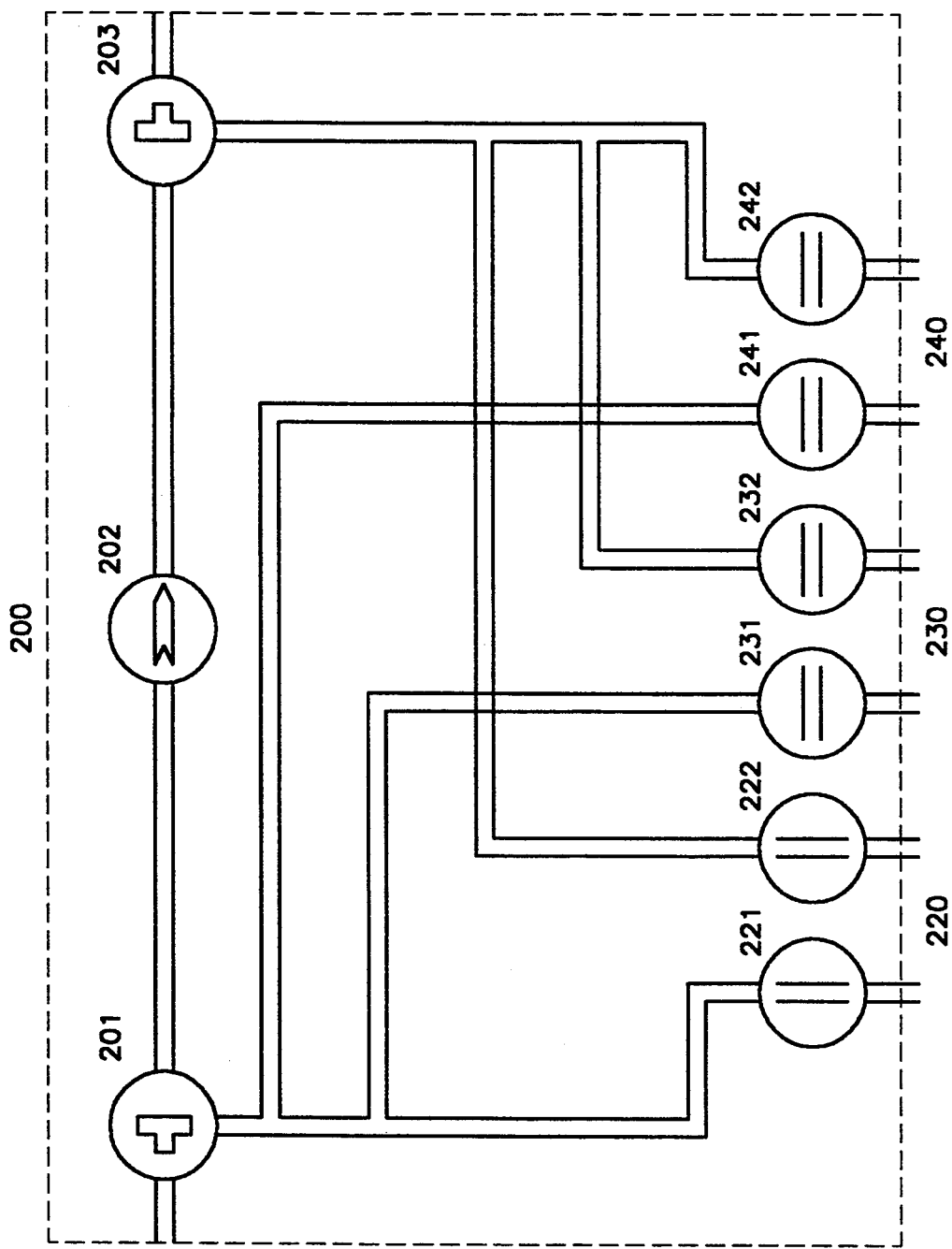

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

BEST MODE FOR CARRYING OUT THE INVENTION

In a preferred embodiment, the system is adapted to be attached to the battery and to be transported with it in its normal use so to provide a method for circulation of electrolyte as it may be needed for efficient battery operation. Alternatively, the recharge and recirculation system may be external to the vehicle, as in a storage facility, where it may be connected to the battery only when the vehicle is not in use. FIG. 1 shows a typical three cell battery 100 with electrolyte input tubes 101 entering the top of each cell and extending to the bottom of each cell. Electrolyte output tubes 102 also enter the top of each cell but at a point furthestmost from the input tubes 101, and extend only slightly within the cell to the level of optimum electrolyte volume. When electrolyte is forced into each cell through the input tube, electrolyte from the lower portion of each cell is forced upward across the electrode plates and while thus forced tends to mix the stratified electrolyte, remove oxygen and hydrogen gas bubbles from the plates, and remove electro-chemical reaction impurities that have accumulated within each cell. As fresh electrolyte is forced into each cell, an equal amount of electrolyte is forced to exit the cell via the output tubes 102, thus maintaining an optimum volume of electrolyte within the cell.

An electrolyte delivery/recovery manifold 200 is required for each battery, as each individual cell must be irrigated at a separate time to prevent electrolyte bridging between the individual cells. This manifold comprises an input control valve 201, oneway check valve 202, output control valve 203, and individual cell input and output control valves 221/222, 231/232, and 241/242. It also comprises the necessary plumbing for transfer of the electrolyte between the valves, cells, and the electrolyte storage unit. The valves are electrically controlled and operated by the circulation control system 400 to be discussed below in conjunction with FIG. 4.

The manifold has three configurations; a closed configuration during which no electrolyte transfer takes place; a momentary equalize configuration during which any pressure differentials within the system can be equalized; and finally the transfer configuration during which time electrolyte is delivered to and removed from an individual cell. FIG. 2a shows the closed configuration, with all control valves in the closed position. FIG. 2b shows the control valves in the momentary equalize configuration. FIG. 2c shows the transfer configuration for delivery to and recovery from the first cell 220, with both the input control valve 201 and output control valve 203 in the open positions, as well as individual cell 220 control valves 221/222 in the open position. Irrigation of cells 230 and 240 is accomplished in a like manner, individually, with their control valves 231/232, or 241/242, in the open position so as to control circulation and thereby prevent electrolyte bridging between cells.

Referring now to FIG. 3, the main electrolyte holding tank 301 is shown connected to pump 302 which transfers electrolyte from the main holding tank 301 via input line 303 to the input/output manifold 200 for transfer through the battery. Upon output from the input/output manifold 200, the electrolyte enters line 304 where it then passes through three-way control valve 305 which directs the electrolyte flow to the main electrolyte holding tank 301. Alternatively, three-way control valve 305 may be positioned to transfer spent-/contaminated electrolyte to an on-board holding tank 330 for subsequent removal from the system. The input port 306 of the main electrolyte holding tank 301 is equipped with a filter assembly 307 to remove impurities from the electrolyte. The main holding tank 301 is also equipped with a vent 310 leading to a catalytic converter assembly 311. Hydrogen and oxygen gases transfer to the catalytic converter assembly 311 for recombination to form water, which then flows back to the main holding tank 301. A fresh electrolyte holding tank 320 is connected to the main holding tank 301 via line 321 for replenishment of electrolyte as necessary. Such transfer may be accomplished automatically by a float-switch assembly 308 to open transfer valve 323 on transfer line 321 when the electrolyte quantity within the main electrolyte holding tank 301 falls below the desired level.

Figure 4:
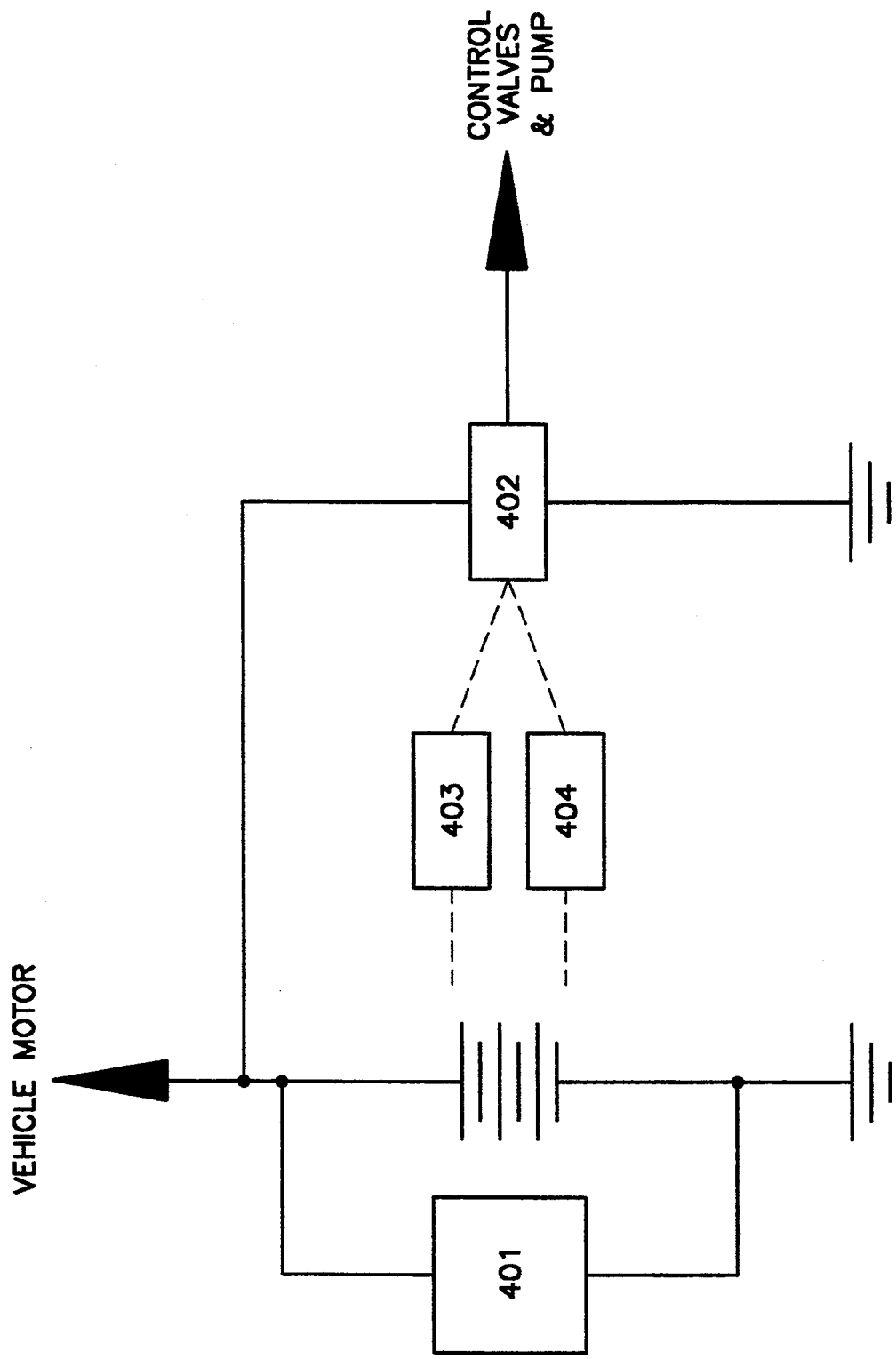
FIG. 4 is an logic diagram of the control system for this invention.

Referring now to the schematic diagram of FIG. 4, an external battery charge terminal 401 provides power to charge the battery 100 when a recharge is necessary. Power is also provided, either from the external battery charging circuit during battery charging periods or from the battery itself during actual operational periods, to operate the various circulation components. The circulation process is controlled by a voltage sensor 403 and a specific gravity sensor 404. When a low voltage or low specific gravity condition is sensed, timer-cycler 402 is turned on which then sequentially controls the circulation of electrolyte through the battery, cell by cell, for a predetermined period of time or until the particular low voltage or low specific gravity condition is overcome.

The control valves of the circulation system would initially be in the closed configuration, as defined previously, such that no electrolyte transfer may take place. Initiation of the circulation process by the timer-cycler 402 would initially rotate the manifold valves to the momentary equalize position to relieve any pressure within the system. The electrolyte of the first cell 220 of battery 100 would then be circulated for a predetermined period of time with the electrolyte pump 302 pumping electrolyte from the holding tank 301, through input valve 201, through cell 220 input tube 221, through cell 220, out cell output tube 222, output valve 203, through three-way transfer valve 305, and finally back to the electrolyte holding tank 301. This process would then continue for each battery cell within the system.

While the invention has been described with a certain degree of particularity, it is manifest that many changes may be made in the details of construction and the arrangement of components without departing from the spirit and scope of the disclosure. It is understood that the invention is not limited to the embodiments set forth herein for purposes of exemplification, but is to be limited only by the scope of the appended claims including the full range of equivalency to which each element thereof is entitled.

Thus, there has been shown and described an improved system for increasing the efficiency of electrochemical batteries which accomplishes at least all of the stated objects.

We claim:

1. A system for increasing the efficiency of electrochemical batteries, comprising:
   (a) a liquid electrolyte battery having a plurality of cells, each cell having an electrolyte input port and an electrolyte output port;
   (b) means for irrigating each of said cells with electrolyte individually and sequentially, one cell at a time.

2. The system as recited in claim 1 wherein said irrigating means comprises a manifold having an input control valve, a one-way check valve, an output control valve, and individual cell input and output control valves.

3. The system as recited in claim 2 wherein said electrolyte input port and said electrolyte output port reside at opposite corners of their respective cells, and said electrolyte input port extends to near the bottom of the cell while said electrolyte output port extends to the electrolyte level.

4. The system as recited in claim 3 wherein said irrigating means functions in response to a low voltage condition.

5. The system as recited in claim 3 wherein said irrigating means functions in response to an electrolyte low specific gravity condition.

6. The system as recited in claim 3 wherein said irrigating means functions in response to both a low voltage condition and an electrolyte low specific gravity condition.

7. The system as recited in claim 6, further comprising a catalytic converter whereby oxygen and hydrogen gases from decomposed electrolyte may be recombined for return to the system.

8. The system as recited in claim 7, further comprising a filter whereby solid byproducts may be removed from the electrolyte.

* * * * *